United States Patent
Munukutla et al.

(10) Patent No.: US 11,323,381 B2
(45) Date of Patent: May 3, 2022

(54) DROPPED PACKET DETECTION AND CLASSIFICATION FOR NETWORKED DEVICES

(71) Applicant: Juniper Networks, Inc., Sunnyvale, CA (US)

(72) Inventors: Venkata Naga Chaitanya Munukutla, Nashua, NH (US); Raveendra Torvi, Nashua, NH (US); Dmitry A. Shokarev, Mountain View, CA (US); Vishnu Pavan Beeram, Ashburn, VA (US); Manikandan Musuvathi Poornachary, Bangalore (IN); Shivam Vaid, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/917,433

(22) Filed: Jun. 30, 2020

(65) Prior Publication Data
US 2021/0328939 A1    Oct. 21, 2021

(30) Foreign Application Priority Data
Apr. 16, 2020    (IN) .............................. 202041016453

(51) Int. Cl.
*H04L 12/823* (2013.01)
*H04L 12/26* (2006.01)
(Continued)

(52) U.S. Cl.
CPC ............ *H04L 47/32* (2013.01); *H04L 43/026* (2013.01); *H04L 43/16* (2013.01); *H04L 45/38* (2013.01); *H04L 49/254* (2013.01)

(58) Field of Classification Search
CPC ....... H04L 47/32; H04L 43/00; H04L 43/026; H04L 49/254; H04L 45/38; H04L 43/16
See application file for complete search history.

(56) References Cited

U.S. PATENT DOCUMENTS

| 10,979,322 B2* | 4/2021 | Kulshreshtha ...... H04L 63/0876 |
| 2013/0117847 A1* | 5/2013 | Friedman .............. H04L 63/102 |
| | | 726/22 |

(Continued)

FOREIGN PATENT DOCUMENTS

EP    3576356 A1    12/2019

OTHER PUBLICATIONS

Claise et al., "Specification of the IP Flow Information Export (IPFIX) Protocol for the Exchange of Flow Information," Internet Engineering Task Force (IETF), RFC 7011, Sep. 2013, 77 pp.

(Continued)

*Primary Examiner* — Mohamed A Kamara
(74) *Attorney, Agent, or Firm* — Shumaker & Sieffert, P.A.

(57) ABSTRACT

In general, this disclosure describes a network device to determine a cause of packets being dropped within a network. An example method includes generating, by a traffic monitor operating on a network device, an exception packet that includes a unique exception code that identifies a cause for a component in the network device to discard a transit packet, and a nexthop index identifying a forwarding path being taken by the transit packet experiencing the exception. The method also includes forwarding the exception packet to a collector to be processed.

20 Claims, 7 Drawing Sheets

(51) Int. Cl.
*H04L 12/721* (2013.01)
*H04L 47/32* (2022.01)
*H04L 43/026* (2022.01)
*H04L 49/253* (2022.01)
*H04L 45/00* (2022.01)
*H04L 43/16* (2022.01)

(56) References Cited

U.S. PATENT DOCUMENTS

| | | | |
|---|---|---|---|
| 2018/0176139 A1 | 6/2018 | Mortensen et al. | |
| 2018/0367364 A1* | 12/2018 | Johansson | G06F 11/3495 |
| 2019/0075056 A1* | 3/2019 | Lu | H04L 43/045 |
| 2021/0152455 A1* | 5/2021 | Castle | H04L 43/0876 |

OTHER PUBLICATIONS

Claise et al., "Information Model for IP Flow Information Export (IPFIX)," Internet Engineering Task Force (IETF), RFC 7012, Sep. 2013, 25 pp.
Extended Search Report from counterpart European Application No. 20197550.5, dated Dec. 17, 2020, 11 pp.

* cited by examiner

700

| Set ID = 2 | Length = N octets |
|---|---|
| Template ID = 256 | Field Count = N |
| forwardingExceptionCode | Field Count = 4 |
| forwardingNextHopID | Field Count = 4 |
| flowDirection | Field Count = 1 |
| ingressInterface | Field Count = 4 |
| egressInterface | Field Count = 4 |
| dataLinkFrameSize | Field Count = 2 |
| DataLinkFrameSection | Field Count = 65535 |
| Padding (opt) ||

FIG. 7

DROPPED PACKET DETECTION AND CLASSIFICATION FOR NETWORKED DEVICES

This application claims the benefit of IN Provisional Application No. 202041016453 filed Apr. 16, 2020, the entire content of which is herein incorporated by reference.

TECHNICAL FIELD

The disclosure relates to packet-based computer networks and, more particularly, to detecting dropped packets within computer networks.

BACKGROUND

A computer network is a collection of interconnected computing devices that can exchange data and share resources. Example network devices include layer two devices that operate within the second layer of the Open Systems Interconnection (OSI) reference model, i.e., the data link layer, and layer three devices that operate within the third layer of the OSI reference model, i.e., the network layer. Network devices within computer networks often include a control unit that provides control plane functionality for the network device and forwarding components for routing or switching data units. In some cases, for example, a network device may include a plurality of packet forwarding engines (PFEs) and a switch fabric that collectively provide a forwarding plane for forwarding network traffic.

The control plane functions provided by the control unit include storing network topologies in the form of a routing information base (RIB), executing routing protocols to communicate with peer routing devices to maintain and update the RIB, and providing a management interface to allow user access and configuration of the network device. The control unit maintains routing information that represents the overall topology of the network and defines routes to destination prefixes within the network.

The control unit derives a forwarding information base (FIB) that includes a number of forwarding entries generated by the control unit in accordance with the routing information and control information. The control unit installs the forwarding structures within the data plane to programmatically configure the forwarding components. The data and instructions that constitute the forwarding entries define an internal forwarding path for each incoming packet received by the network device. For example, to generate a route table lookup forwarding entry, the control unit selects routes defined by the network topology and maps packet key information (e.g., destination information and other select information from a packet header) to one or more specific next hop network devices and ultimately to one or more specific output interfaces of interface cards of the network device. In some cases, the control unit may install the forwarding structures into each of the PFEs to update the forwarding table within each of the PFEs and control traffic forwarding within the data plane. Bifurcating control and data plane functionality allows the forwarding table in each of PFEs to be updated without degrading packet forwarding performance of the network device.

SUMMARY

In general, the disclosure describes techniques to export packet drop information from a router or other networked device to a collector to reduce failure detection time in the network and provide information to troubleshoot the component and automate a remedial response. Network devices include a traffic monitor that inspects dropped packets and forwards dropped packet metadata to a monitor service. The traffic monitor uses a push model for data reporting from the entities in the network device which encounter packet drops. Whenever a packet drop happens inside a forwarding plane (e.g., of a PFE) of a device in a network, a traffic monitor collects metadata relating to, for example, reason for packet drop (e.g., known by the entity that dropped the packet), flow which encountered the drop (e.g., obtained from content of dropped packet), flow direction (ingress/egress), input interface, and/or output interface on which this packet was flowing, etc. The traffic monitor captures details of the discarded packet and generates an Internet Protocol Flow Information Export (IPFIX) exception packet using an IPFIX exception template. The IPFIX exception packet includes a unique forwarding exception code to identify the cause of the discard and an identifier of the discarded packet's nexthop to facilitate determining the component responsible for the discard. A collector uses this information in the IPFIX exception packet to determine if one or more of the control plane entities of the network devices require remedial action.

An example method includes generating, by a traffic monitor operating on a network device, an IPFIX exception packet and forwarding the exception packet to a collector to be processed. The exception packet includes a unique exception code that identifies a cause for a forwarding component in the network device to discard a transit packet, and a nexthop index identifying a forwarding path being taken by the transit packet experiencing the exception; and An example network device includes a forwarding plane, a control plane comprising one or more processors, and a traffic monitor configured for execution by the control unit. The forwarding plane includes a plurality of forwarding components to route transit packets from input interfaces to output interfaces of the network device. The traffic monitor, when one of the forwarding components drops one of the transit packets, generates an exception packet for the dropped transit packet and forwards the exception packet to a collector to be processed to identify when the forwarding component that discarded the dropped transit packet is experiencing a failure. The exception packet includes a unique exception code that identifies a cause for the forwarding component in the network device to discard the dropped transit packet received on the network device, and a nexthop index identifying a forwarding path being taken by the transit packet experiencing the exception.

An example computer readable medium comprising instruction that, when executed, cause a network device to generate, by a traffic monitor operating on the network device, an exception packet including a unique exception code that identifies a cause for a component in the network device to discard a transit packet, and a nexthop index identifying a forwarding path being taken by the transit packet experiencing the exception. The instructions also cause the network device to forward the exception packet to a collector to be processed.

The details of one or more examples are set forth in the accompanying drawings and the description below. Other features, objects, and advantages will be apparent from the description and drawings, and from the claims.

BRIEF DESCRIPTION OF DRAWINGS

FIG. 7 illustrates an example exception template used to generate the IPFIX exception packet in accordance with principles described in this disclosure.

DETAILED DESCRIPTION

Figure 1:
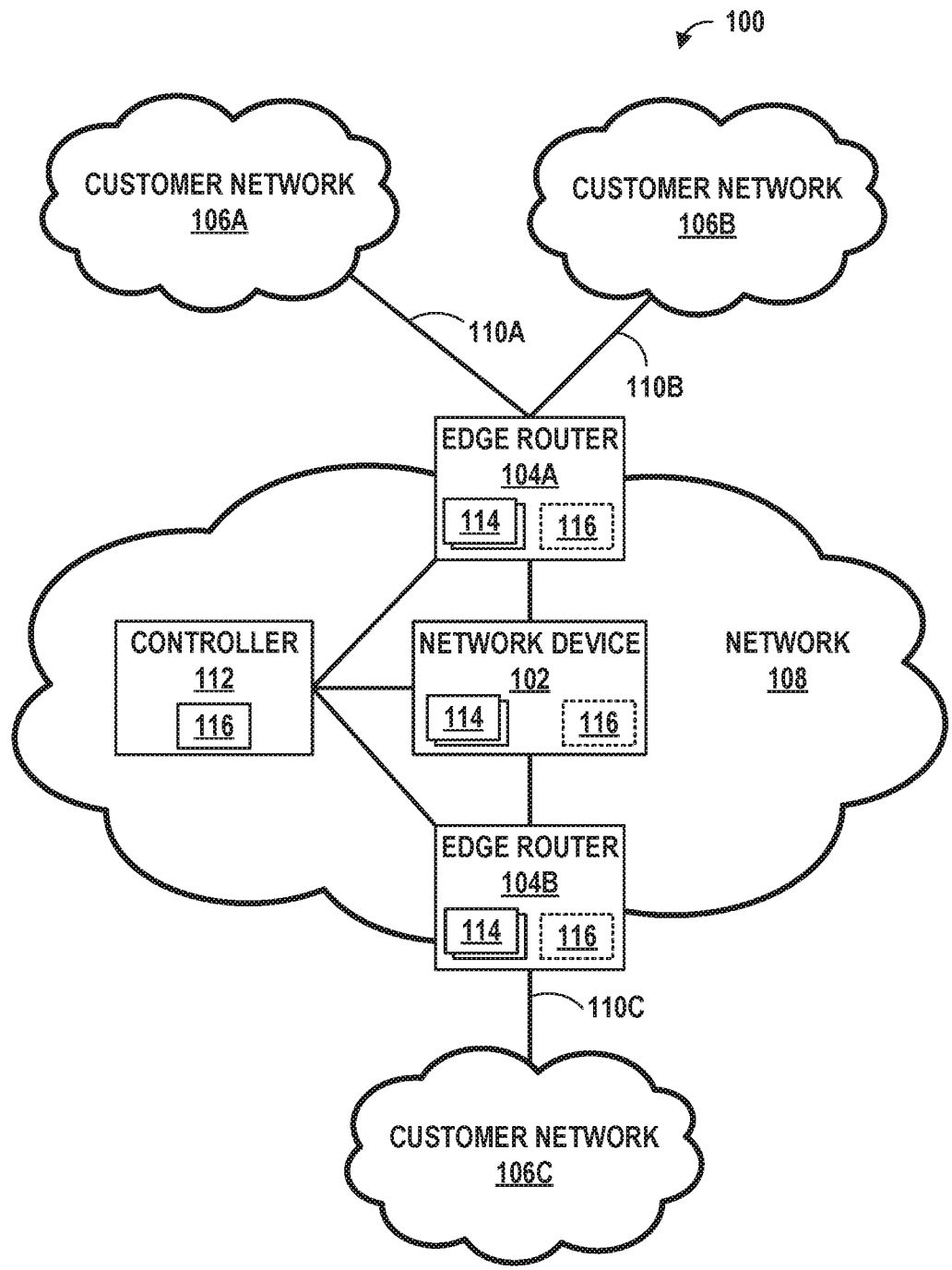
FIG. 1 illustrates a system with network devices operating in accordance with the principles described in this disclosure.

Techniques described herein export packet drop information from a router or other networked device to a collector (e.g., an internal or external service) to determine a cause of the dropped packet. These techniques facilitate reducing failure detection time in the network and provide information to troubleshoot the component and automate a remedial response. In a network, packets (sometimes referred to as "transit packets") can get dropped (sometimes referred to as being "discarded") inside any given router or networked device within a network topology. Typically, a forwarding plane of a high-performance distributed router platform consists of line cards that host multiple packet forwarding engines (PFEs). The packet drops can happen in any of these PFEs. The reason for packet dropping can vary. For example, a packet can be dropped or discarded as a result of a software bug, misconfiguration of a routing table, a policer, performance limitation, and/or a firewall setting, etc. The traditional way to debug packet drop is to login to the network device and use CLI show commands to correlate the forwarding state and packet path. Statistics values are then used to figure which area of the forwarding chain potentially has a problem. This is a pull model. Information is pulled from the router to debug a discard. However, with a large number of network devices in a network topology, debugging using a pull model to determine which flow is getting discarded inside a given network device is tedious and unscalable.

As described below, network devices include a traffic monitor that inspects (e.g., samples, etc.) dropped packets and forwards dropped packet metadata to a monitor service. The traffic monitor uses a push model for data reporting from the entities in the network device which encounter packet drops. This facilitates automating the workflow involved in detecting, reporting and mitigating these packet drops. Whenever a packet drop happens inside a forwarding plane (e.g., of a PFE), the traffic monitor collects metadata relating to, for example, reason for packet drop (e.g., known by the entity that dropped the packet), flow which encountered the drop (e.g., obtained from content of dropped packet), direction (ingress/egress), input interface, and/or output interface on which this packet was flowing, the packet length etc., and generates an exception packet with one or more of these details. The metadata facilitates determining a root cause for the dropped packet. In some examples, the traffic monitor generates an Internet Protocol Flow Information Export (IPFIX) exception packet using an IPFIX exception template. The exception packet contains information elements about the exception code (e.g., an identifier that uniquely identifies the reason for the drop), the first N bytes of the dropped packet, and any relevant metadata collected by the traffic monitor. A given IPFIX packet can also contain multiple instances of such information elements conveying information about more than one flow which experienced drop. For each such flow, information element like exception code, and/or forwarding nexthop id, etc. will be included.

In a sample flow of a packet across a network device, a packet is received on an input interface (IIF) on an ingress PFE of the network device and undergoes a forwarding lookup. The packet is then sent over the internal switch fabric towards an egress PFE of the network device based on the lookup result. The egress PFE adds any relevant encapsulation on the packet and sends it over the output interface (OIF). Packets can get dropped inside a network device because of various reasons. This includes packet lookup pointing to discard function, expired TTL, invalid checksum in IP header etc. All packets that get discarded may be reported to the traffic monitor (via a packet inspection mechanism). The traffic monitor inspects (e.g., samples, etc.) the discarded packets for the original nexthop index of the packet and other metadata, determines a forwarding exception code (based on what entity dropped the packet), and encodes the metadata into the exception packet.

The exception packet is forwarded to a collector which may be internal to the network device or external to the network device. The collector collects and analyzes the exception packet for a pattern indicative of an issue. For example, while an occasional dropped packet from a filter on the ingress PEE may not be indicative of an issue, more packet drops than expected (e.g., a threshold number of packet drops in a predefined period of time) may be indicative of an issue. When an issue is detected, the monitor may provide an alert and/or initiate an automated remedial action. These techniques can reduce Mean Time to Repair (MTTR) first order network issues by automating the workflow involved in detecting, reporting and mitigating these packet drops.

FIG. 1 is a block diagram illustrating an example network environment in which a network includes a network device configured in accordance with techniques described in this disclosure. For purposes of example, the principles of the invention are described with respect to a simplified network environment 100 of FIG. 1 in which a network device 102 (sometimes referred to as a "core router") communicates with edge routers 104A and 104B (collectively "edge routers 104") to provide customer networks 106A-106C (collectively "customer networks 106") with access to network 108. Network 108 may be, for example, a service provider network or a cloud computing network. The router 102 may exchange routing information with the edge routers 104 and/or controller 112 in order to maintain an accurate representation of the topology of the network environment 100. As described below, the network device 102 may consist of a plurality of cooperative routing components operating as a single node within the service provider network 108. The network device 102 includes a chassis (not shown in FIG. 1) that couples various internal routing components (e.g., line cards, switching fabric cards, a routing engine card, etc.) together.

Although not illustrated, the network 108 may be coupled to one or more networks administered by other providers, and may thus form part of a large-scale public network infrastructure, e.g., the Internet. Consequently, the customer networks 106 may be viewed as edge networks of the Internet. The network 108 may provide computing devices within the customer networks 106 with access to the Internet, and may allow the computing devices within the customer networks 106 to communicate with each other. In another example, the service provider network 108 may provide network services within the core of the Internet. As another example, the network 108 may provide services (e.g., cloud computing services, etc.) to the computing devices with the customer networks 106. In either case, the network 108 may include a variety of network devices (not shown) other than the router 102 and the edge routers 104, such as additional routers, switches, servers, or other devices.

In the illustrated example, the edge router 104A is coupled to the customer network 106A via access link 110A, and the edge router 104B is coupled to the customer networks 106B and 106C via additional access links 110B and 110C. The customer networks 106 may be networks for geographically separated sites of an enterprise. The customer networks 106 may include one or more computing devices (not shown), such as personal computers, laptop computers, handheld computers, workstations, servers, switches, printers, customer data centers or other devices. The configuration of the network environment 100 illustrated in FIG. 1 is merely an example. The service provider network 108 may be coupled to any number of the customer networks 106. Nonetheless, for ease of description, only an example number of customer networks 106A-106C are illustrated in FIG. 1. Many different types of networks beside networks 108 may employ an instance of the router 102, including customer/enterprise networks, transport networks, aggregation or access networks, and so forth. Network traffic may flow, for example, from one customer network 106A to another customer network 106C through network device 102.

The network device 102 and the edge routers 104 include components that are responsible for the flow of packets through the device. These components may, from time to time, drop packets when certain criteria are met or due to underlying issues (such as, a misconfiguration, a coding error, etc.). For example, the network device 102 and the edge routers 104 may include PFEs with interface cards with input interfaces (IIFs) and output interfaces (OIFs) that include filters. In such an example, if one or more contents of the packet (e.g., the header of the packet) meet the filtering criteria, packet may be discarded. As another example, the source or destination in the header of the packet may be corrupted or may not be associated with an entry on the forwarding table. In such examples, the processor may discard the packet because forwarding path cannot be determined. When a component discards a packet, the component may encapsulate the dropped packet in a sample frame (e.g., including an exception code and the nexthop of the dropped packet, etc.). In such examples, the sample frame is forwarded to a traffic monitor 114.

In the illustrated example, service provider network 108 includes a controller 112. In some examples, controller 112 may comprises software-defined networking controller. Controller 112 may monitor service provider network 108 and provide an interface for administrators to configure and/or monitor devices within service provider network 108 (e.g., network device 102, edge routers 104, etc.). In some examples, controller 112 may perform diagnostic functions and display health of network 108 in a graphical user interface to facilitate maintenance of network 108. In other examples, controller 112 may advertise the topology of network 108 and/or perform path computation based on the topology of network 108 and advertise routing updates to the devices within network 108.

In the illustrated example, each of network device 102 and edge routers 104 includes one or more instances of traffic monitor 114. When traffic monitor 114 receives a dropped packet, traffic monitor 114 inspects the header of the packet and generates an exception packet according to an exception template. While an IPFIX exception packet and an IPFIX exception template are described below, other exception reporting formats may alternatively be used. IPFIX is a format for reporting network information elements. IPFIX enables enterprise specific extensions (e.g., via templates) to encode and report data. The traffic monitor 114 retrieves the data from the dropped packet and generates the IPFIX exception packet. The traffic monitor 114 forwards the IPFIX exception packet to a controller 116.

MIX is described in greater detail in (lake, et al., "Specification of the IP Flow Information Export (IPFIX) Protocol for the Exchange of Flow Information," Internet Engineering Task Force (IETF) Request for Comments (RFC) 7011, September 2013, the entire content of which is incorporated herein by reference. More details on the IPFIX information elements and templates can be found in Claise, et al., "Information Model for IP Flow Information Export (IPFIX)," IETF RFC 7012, September 2013, the entire content of which is incorporated herein by reference.

In the illustrated example, the controller 112 includes the collector 116. While in the illustrated example, the collector 116 is executing on the controller 112, alternatively or additionally, in some examples, the collector may be executing on a control plane of any of the network devices 102 and/or edge routers 104. The collector 116 receives the IPFIX exception packets from the traffic monitor(s) 114. The collector 116 categorizes exceptions within the received IPFIX exception packets as either as normal or a fault. Normal exceptions are suppressed (e.g., not reported, not added to the exception log, etc.). The collector 116 enriches exceptions categorized as faults with additional information that helps further identify fault context and reports the fault to the performance monitoring system. The collector 116 determines whether the dropped packets are normal or faults using metadata contained therein. For example, if collector receives an IPFIX packet indicating a flow being discarded in datapath post route lookup but the Control Plane state indicates that the packet destination IP should have a valid forwarding state, it represents an inconsistency. In response to determining that a component has an issue based on the IPFIX exception packets, the collector generates an alert. In some example, collector 116 may trigger an automated remediation response.

The location of collector 116 (e.g., on a control unit of the network device 102/edge routers 104, on the controller 112, etc.) is selected based on the location of the state information needed for exception categorization and data enrichment. For example, IP packet discard categorization may be performed on the network device 102 by checking a control plane view of the FIB state. When the collector 116 is on the network device 102, the collector 116 may be a daemon which can also do post processing of exception data (e.g. looking at routing protocol daemon (RPD) forwarding states and take corrective actions). Where the collector 116 is a service executing on the controller 112, the collector 116 may include a mirror view of forwarding state information for the network devices/edge routers 104 in the service provider network 108 to do post processing of exception data. In some examples, the collector is tuned to reduce false positives rates. For example, the threshold of the collector 116 may be set such that the collector 116 may identify normal drops as fault drops less than 10% of the time. In some examples, when collectors 116 are daemons operating on the network devices 102, 104, a collector 116 operating on the controller 112 may receive fault reports generated by the network devices 102, 104 that indicate when a fault is detected based on the IPFIX exception packets.

Figure 2:
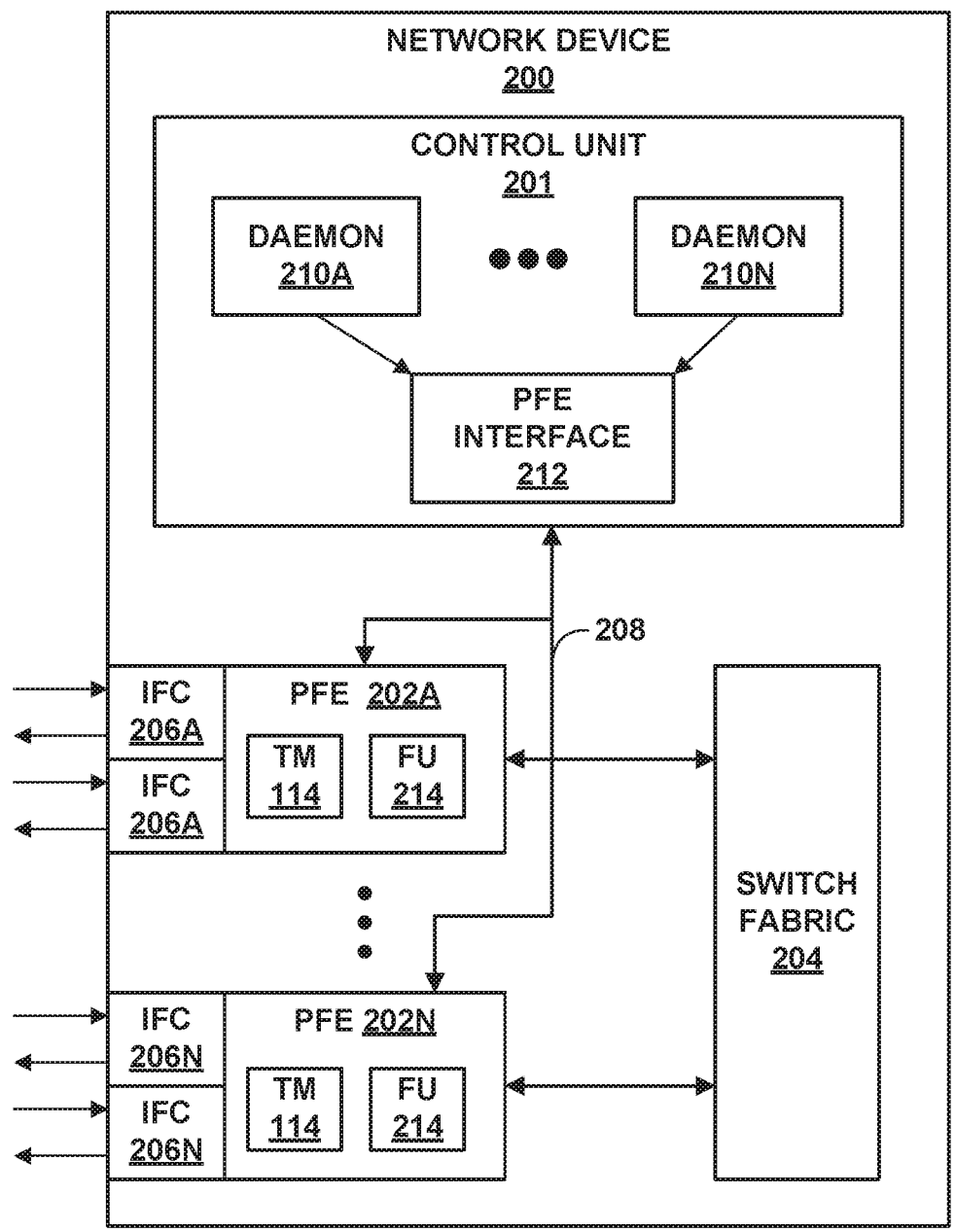
FIG. 2 is a block diagram illustrating an example network device that includes a traffic monitor operating in accordance with principles described in this disclosure.

FIG. 2 is a block diagram illustrating an example network device that includes a traffic monitor operating in accordance with principles described in this disclosure. Network device 102 may comprise a router such as a provider edge or customer edge router, a core router, or another type of network device, such as a switch.

In this example, network device 200 includes a control unit 201 that provides control plane functionality for the device. Networked device 200 is an example of network device 102 and edge routers 104. Network device 200 also includes a plurality of forwarding components in the form of example packet forwarding engines 202A-202N ("PFEs 202") and a switch fabric 204 that together provide a data plane for forwarding network traffic. PFEs 202 receive and send data packets via interfaces of interface cards 206A-206N ("IFCs 206") each associated with a respective one of PFEs 202. Each of PFEs 202 and its associated ones of IFCs 206 may reside on a separate line card for network device 102 (not shown). Example line cards include flexible programmable integrated circuit (PIC) concentrators (PFCs), dense port concentrators (DPCs), and modular port concentrators (MPCs). Each of IFCs 206 may include interfaces for various combinations of layer two (L2) technologies, including Ethernet, Gigabit Ethernet (GigE), and Synchronous Optical Networking (SONET) interfaces. In various aspects, each of PFEs 20 may comprise more or fewer IFCs. Switch fabric 204 provides a high-speed interconnect for forwarding incoming data packets to the selected one of PFEs 202 for output over a network.

Control unit 201 is connected to each of PFEs 202 by internal communication link 208. Internal communication link 208 may comprise a 100 Mbps Ethernet connection, for instance. Daemons 210A-210N ("daemons 210") executed by control unit 201 are user-level processes that run network management software, execute routing protocols to communicate with peer routing devices, maintain and update one or more routing tables, and create one or more forwarding tables for installation to PFEs 202, among other functions. Collector daemon 116 from FIG. 1 is an example of daemons 210 executed by control unit 201. Daemons 210 are communicatively couple to PFEs 202 via a PFE interface 212 within control unit 201.

Control unit 201 may include one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the one or more processors to perform techniques described herein. Alternatively, or in addition, control unit 12 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

PFEs 202 process packets by performing a series of operations on each packet over respective internal packet forwarding paths as the packets traverse the internal architecture of network device 200. Operations may be performed, for example, on each packet by any of a corresponding ingress interface, an ingress PFE 202, an egress PFE 202, an egress interface or other components of network device 200 to which the packet is directed prior to egress, such as one or more service cards. PFEs 202 each include hardware and/or software forwarding units (FUs) 214 that examine the contents of each packet (or another packet property, e.g., incoming interface) to make forwarding decisions, apply filters, and/or perform accounting, management, traffic analysis, and/or load balancing. In one example, each of PFEs 202 arranges forwarding units 214 as next hop data that can be chained together as a series of "hops" along an internal packet forwarding path for the network device. The result of packet processing determines the manner in which a packet is forwarded or otherwise processed by PFEs 202 from its input interface on one of IFCs 206 to its output interface on one of IFCs 206.

Forwarding units 214 include a lookup data structure (sometimes referred to as a "forwarding table") to perform lookup operations, such as a tree (or trie) search, a table (or index) search, a filter determination and application, or a rate limiter determination and application. Lookup operations locate a routing entry that matches packet contents or another property of the packet or packet flow, such as the inbound interface of the packet. As described below, forwarding units 214 also include a consistency data structure (sometime referred to as a "consistency table") to store attributes of the routing entries to facilitate generating consistency information for a consistency check. In some examples, the forwarding table and the consistency table are stored in separate data structures. Alternatively, in some examples, the forwarding table and the consistency table may be stored in the same data structure.

From time to time, components of the forwarding units 214 may drop packets. When one of the components of the forwarding units 214 drops a packet; the forwarding unit 214 encapsulates that dropped packet into an IPFIX frame with the nexthop index of the dropped packet and an exception code. The dropped packet is forwarded to the traffic monitor 114. The exception codes are predefined codes that uniquely identify the reason the packet was dropped. In some examples, the exception codes are four octets. In some examples, the exception codes are predefined for the most common reasons that packets are dropped. Examples of exceptions are illustrated on Table 1 below.

TABLE 1

| Exception-Name | Description |
| --- | --- |
| Discard route | Route lookup result points to discard function |
| Bad IPv4 Header checksum | Received packet has bad IPv4 checksum |
| Expired TTL | Received packet has TTL = 1 and needs further routing |
| Firewall Discard | Received packet hit a filter function which discards the packet |
| VLAN mismatch | Bridged packet dropped due to vlan tag mismatch |

Table 1 above includes example names of forwarding exception codes and a brief description of the forwarding exception code. In some examples, the forwarding exception code be associated with metadata (or the category of metadata) to include in the corresponding exception packet.

The traffic monitor 114 generates the IPFIX exception packet and forwards it to the collector. The IPFIX exception packet includes the exception forwarding data (e.g., exception code, raw packet content along with metadata and additional information about exception context). The traffic monitor 114 uses an IPFIX exception template. FIG. 7 illustrates an example format for an IPFIX exception template 700. A description of the IPFIX exception template 700 that includes example exception forwarding data is provided on Table 2 below.

TABLE 2

| Field | Description |
|---|---|
| Template ID | Value that identifies the packet as an IPFIX exception packet to report a dropped packet |
| forwardingExceptionCode | A unique identifier that identifies the reason the component dropped the packet (e.g., the reason being supplied by the component) |
| forwardingNextHopId | When sending packets to any given destination inside the router, the reachability is defined using a next-hop which is typically represented in the forwarding path as an index. The nexthop index uniquely identifies the egress path that the packet would take to reach the destination. This could include information about the outgoing interface, forwarding features configured for the packet path etc. |
| flowDirection | The direction of the Flow of the packet (e.g., ingress flow, egress flow) |
| ingressInterface | An index of the interface on which packets of this Flow are being received. |
| egressInterface | The index of the interface where packets of this Flow are being sent |
| dataLinkFrameSize | Specifies the length of the data link frame |
| dataLinkFrameSection | n octets of data and metadata from the data link frame |

The forwarding exception code ("forwardingExceptionCode") field contains a unique identifier that identifies the reason the component dropped the packet. In some examples, the forwarding components include a list that contains one or more of the forwarding exception codes that correspond with actions that may cause the forwarding component to drop the packet. The forwarding component may include one of the forwarding exception codes that corresponds with the reason the packet was dropped in the sample frame of the forwarded sampling packet. The forwarding nexthop identifier ("forwardingNextHopId") field includes the value of the dropped packet's original nexthop index. The forwarding nexthop identifier facilitates identifying a control plane entity that has programed the original nexthop.

Figure 3:
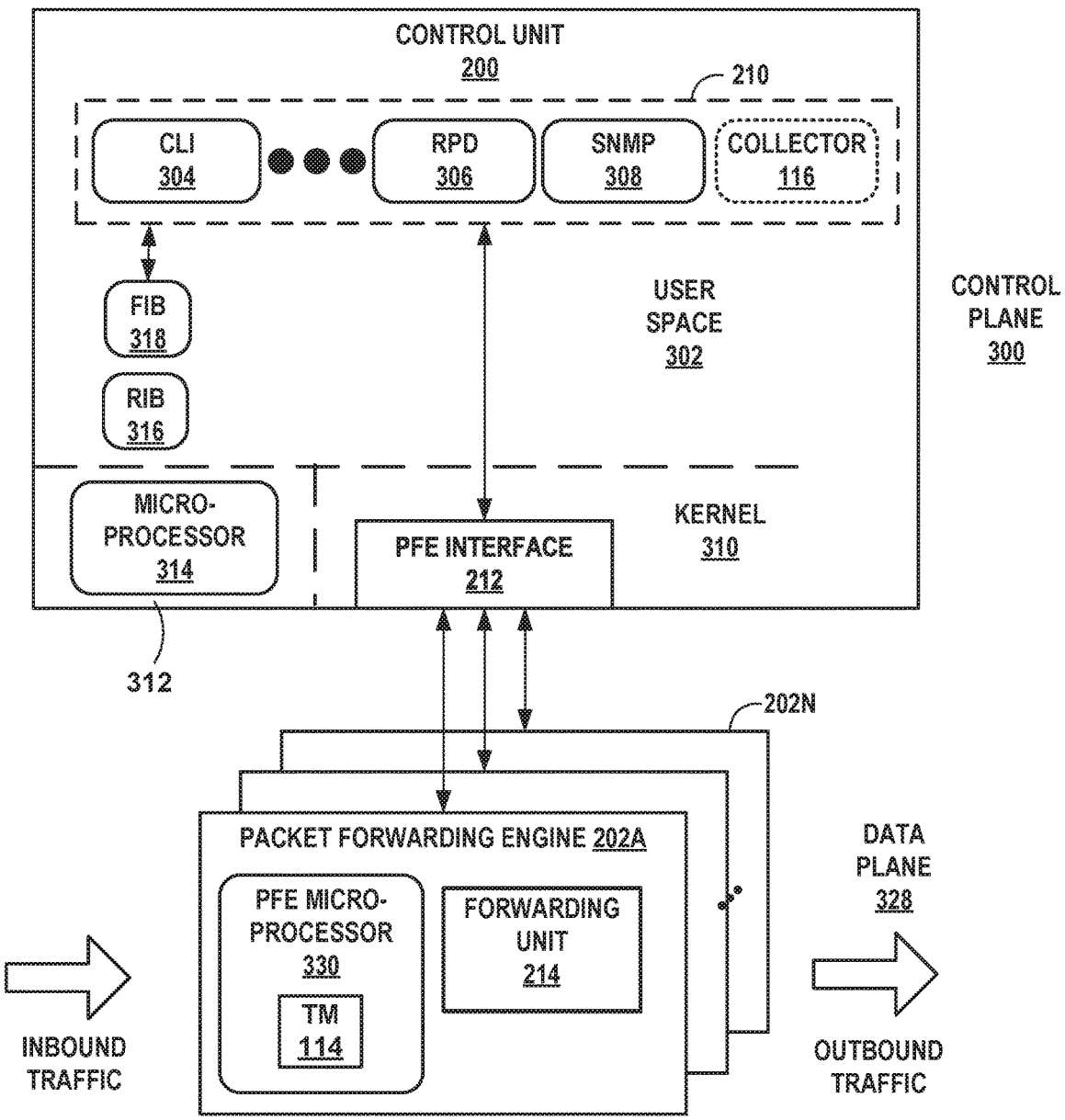
FIG. 3 is a block diagram illustrating an example of the network device of FIGS. 1 and 2 in further detail.

FIG. 3 is a block diagram illustrating an example embodiment of network device 200 of FIG. 2 in further detail. In this example, control unit 201 provides a control plane 300 operating environment for execution of various user-level daemons 210 executing in user space 302. Daemons 210 may include command-line interface daemon 304 ("CU 304"), routing protocol daemon 306 ("RPD 306"), Simple Network Management Protocol daemon 308 ("SNMP 308"), and, in some examples, the collector daemon 116 ("collector 116"). In this respect, control plane 300 may provide routing plane, service plane, and management plane functionality for network device 102. Various instances of control unit 201 may include additional daemons 210 not shown in FIG. 3 that perform other control, management, or service plane functionality and/or drive and otherwise manage data plane functionality for network device 102.

Daemons 210 operate over and interact with kernel 310, which provides a run-time operating environment for user-level processes. Kernel 310 may comprise, for example, a UNIX operating system derivative such as Linux or Berkeley Software Distribution (BSD). Kernel 310 offers libraries and drivers by which daemons 210 may interact with the underlying system. PFE interface 212 of kernel 310 comprises a kernel-level library by which daemons 210, such as collector daemon 114, and other user-level processes or user-level libraries may interact with PFEs 202. PFE interface 212 may include, for example, a sockets library for communicating with PFEs 202 over dedicated network links.

Hardware environment 312 of control unit 201 comprises microprocessor 314 that executes program instructions loaded into a main memory (not shown in FIG. 3) from storage (also not shown in FIG. 3) in order to execute the software stack, including both kernel 310 and user space 302, of control unit 201. Microprocessor 314 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

RPD 306 executes one or more interior and/or exterior routing protocols to exchange routing information with other network devices and store received routing information in routing information base 316 ("RIB 316"). RIB 316 may include information defining a topology of a network, including one or more routing tables and/or link-state databases. RPD 306 resolves the topology defined by routing information in RIB 316 to select or determine one or more active routes through the network and then installs these routes to forwarding information base 318 ("FIB 42"). As used here, the information in the RIB 216 used to define each route is referred to as a "routing entry." Typically, RPD 306 generates FIB 318 in the form of a radix or other lookup tree to map packet information (e.g., header information having destination information and/or a label stack) to next hops and ultimately to interface ports of interface cards associated with respective PFEs 202.

Command line interface daemon 304 ("CLI 304") provides a shell by which an administrator or other management entity may modify the configuration of network device 102 using text-based commands. Simple Network Management Protocol daemon 308 ("SNMP 308") comprises an SNMP agent that receives SNMP commands from a management entity to set and retrieve configuration and management information for network device 102. Using CLI 304 and SNMP 308, management entities may enable/disable and configure services, install routes, enable/disable and configure rate limiters, and configure interfaces, for example. As described in detail below, RPD 306, CLI 304, and SNMP 308 configure data plane 328 to implement configured services, and otherwise add/modify/delete routes.

PFEs 202 implement data plane 328 (also known as a "forwarding plane") functionality to handle packet processing from ingress interfaces on which packets are received to egress interfaces to which packets are sent. Data plane 328 determines data packet forwarding through network device 102, applies services, rate limits packet flows, filters packets, and otherwise processes the packets using forwarding table 320 installed by control plane 300 to data plane 328. While FIG. 3 illustrates only PFE 202A in detail, each of PFEs 202 comprises similar components that perform substantially similar functionality.

PFE 202s bind actions to be performed on packets received by the PFEs to identification of one or more properties of the packets. That is, upon identifying certain packet properties, PFEs 202 perform the action bound to the properties. Packet properties may include packet metadata such as a particular packet's ingress interface or egress interface (as determined by the PFEs) as well as information carried by the packet and packet header, such as packet header fields, destination route prefixes, layer four (L4) or Transport Layer protocol destination ports, and the packet payload. Actions bound to packet characteristics may include count, discard, forward to a specified next-hop or interface, filter, sample, rate limit, and Quality of Service (QoS) marking, differential services (DiffServ), load balance, intrusion detection and prevention, L2 class of service (CoS), and L2 or L2 Virtual Private Network (L2VPN) switching.

PFE microprocessor 330 may execute a microkernel to provide an operating environment for processing packets through the forwarding unit 214. In the illustrated example, PFE microprocessor 330 includes the traffic monitor 114 as described above.

Figure 4:
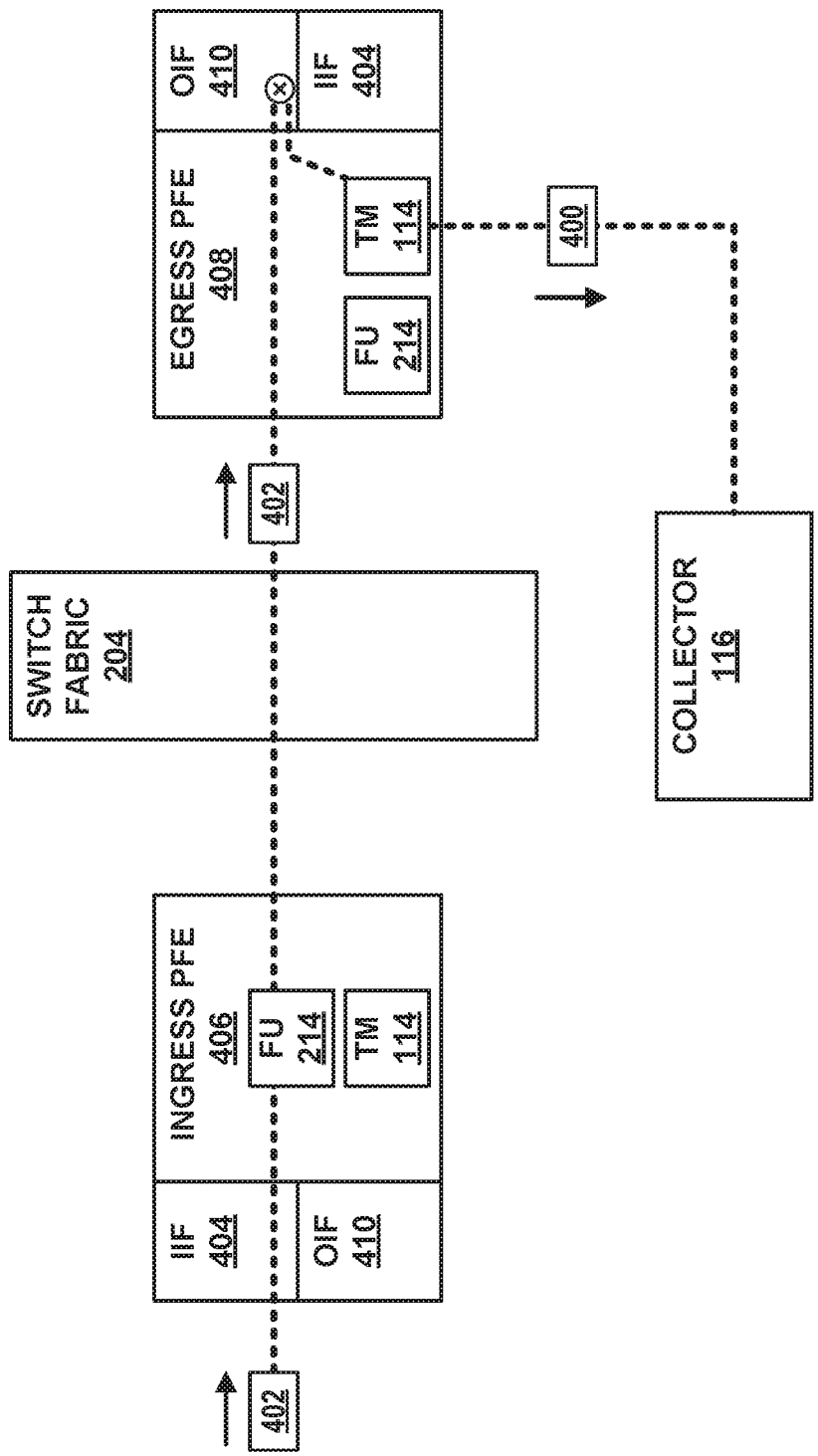
FIG. 4 is a conceptual diagram illustrating a network device generating an IPFIX exception message in egress direction in response to a dropped packet in accordance with principles described in this disclosure.

FIG. 4 is a conceptual diagram illustrating a network device generating an IPFIX exception message 400 in response to a dropped packet in accordance with principles described in this disclosure. In the illustrated example, a packet 402 is received on an input interface (IIF) 404 of an ingress PFE 406. Ingress PFE 406 is an example of PFE 202 of FIG. 2. The packet 402 undergoes a forwarding lookup by the forwarding unit 214. The packet 402 is then sent over switch fabric 204 towards egress PFE 408 based on the lookup result. Egress PFE 408 is an example of PFE 202 of FIG. 2. The egress PFE 408 adds any relevant encapsulation on the packet 402 and sends it over output interface (OFF) 410. In the illustrated example, OFF 410 includes an output filter that has a discard action in case some packet fields map to the match conditions in the filter (e.g., a packet has a source address that is to be blocked, etc.). The egress PFE 408 forwards the discarded packet to traffic monitor 114. The traffic monitor 114 inspects the discarded packet for the metadata, determines a forwarding exception code. Traffic monitor 114 encodes the forwarding exception code, the original nexthop identifier, and the metadata into MIN exception packet 400 (sometime collectively referred to as "exception forwarding data"). Traffic monitor 114 then forwards IPFIX exception packet 400 to collector 116.

Figure 5:
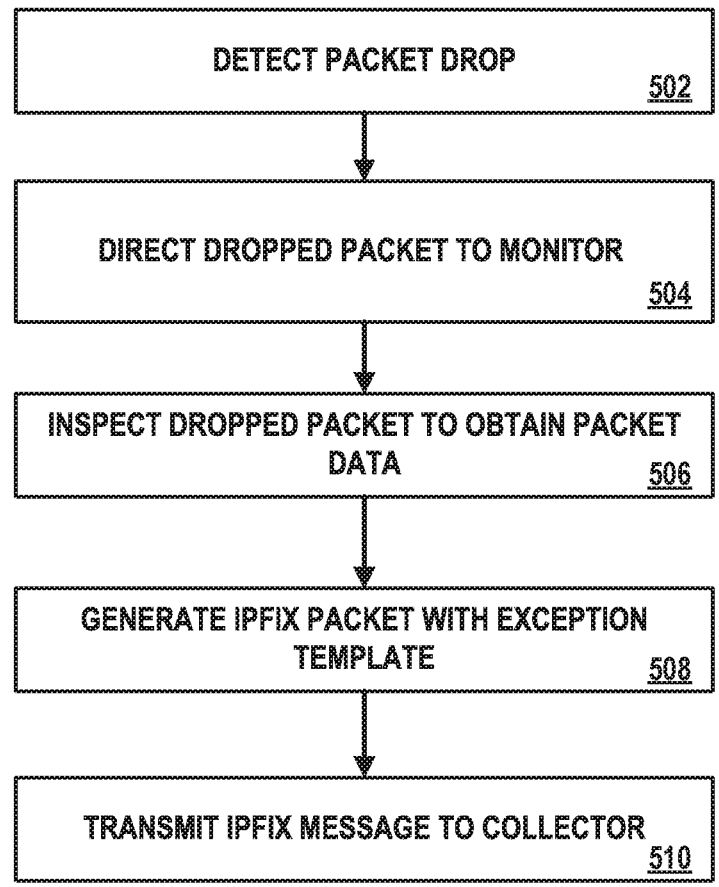
FIG. 5 is a flowchart of an example method to generate an IPFIX exception packet in accordance with principles described in this disclosure.

FIG. 5 is a flowchart of an example method to generate an IPFIX exception packet 400 in accordance with principles described in this disclosure. The PFE 202 detects a dropped packet (502). PFE 202 forwards the dropped packet to traffic monitor 114 (504). Traffic monitor 114 samples the dropped packet for the metadata and determines a forwarding exception code (506). For example, traffic monitor 114 may look up the forwarding exception code from a list of standardized forwarding exception codes based on the reason for the discard supplied by the component that discarded the packet. Traffic monitor 114 encodes the exception forwarding data into IPFIX exception packet 400 (508). Traffic monitor 114 transmits IPFIX exception packet 400 to collector 116 (510).

Figure 6:
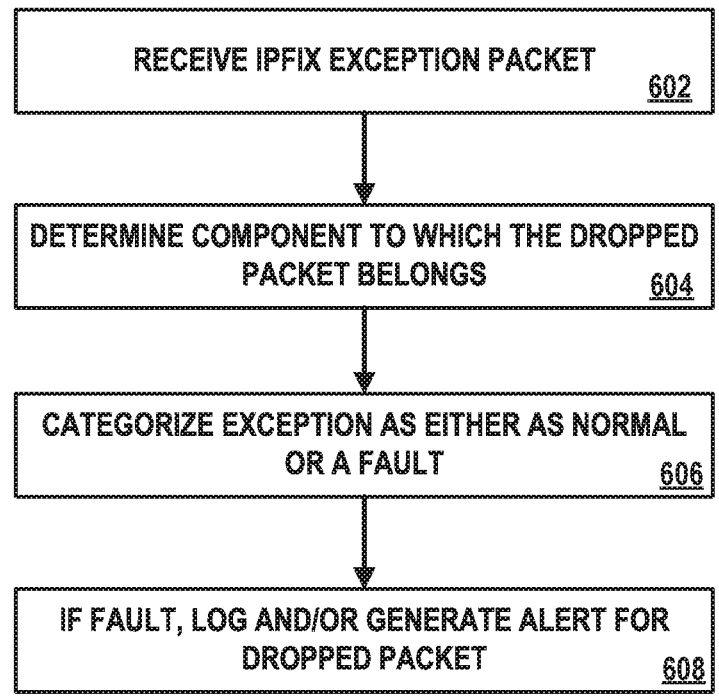
FIG. 6 is a flowchart of an example method to process the received IPFIX exception packet in accordance with principles described in this disclosure.

FIG. 6 is a flowchart of an example method to process the IP IX exception packets 400 in accordance with principles described in this disclosure. Collector 116 receives IPFIX exception packet 400 (602). Collector 116 determines the component to which the dropped packet belongs and the flow path on which the packet was discarded (604). Collector 116 makes this determination based on the forwarding exception code, the nexthop identifier, and the metadata included in the IPFIX exception packet. Based on the determination, collector 116 categorizes the exception within IPFIX exception packet 400 as either as normal or a fault (606). The exception may be a fault based on the reason it was dropped (e.g., no defined forwarding path) and/or the exception may be a fault when it occurs more frequently than expected (e.g., more than a threshold number of time during a predetermined time period, etc.). If the exception is a fault, collector 106 logs and/or generate alert for dropped packet (608). In some examples, the occurrence of one or more faults may trigger an automatic remedial action, such as causing the network device to check the consistency of its forwarding tables. For example, an administrator may define one or more rules that include a trigger condition (e.g., receiving a threshold number of exception packets with a particular exception code within a certain amount of time, etc.) and a remedial action (e.g., trigger an SNMP trap, etc.).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

The invention claimed is:

1. A method comprising:
    generating, by a traffic monitor operating on a network device, an IPFIX exception packet comprising:
        a unique exception code that identifies a cause for a forwarding component in the network device to discard a transit packet, and
        a nexthop index identifying a forwarding path being taken by the transit packet experiencing an exception, the nexthop index identifying an egress path for the transit packet from the network device to a destination network device; and
    forwarding the IPFIX exception packet to a collector to be processed.

2. The method of claim 1, comprising receiving by the traffic monitor, from the forwarding component in the network device, at least a portion of the transit packet accompanied by the nexthop index, the unique exception code, and transit packet metadata.

3. The method of claim 2, wherein the transit packet is received via a nexthop inserted into the transit packet to direct the transit packet to the traffic monitor.

4. The method of claim 1, wherein the IPFIX exception packet is encoded according to a predefined exception template.

5. The method of claim 1, wherein the unique exception code comprises a code indicating a discard route, a bad Internet Protocol header checksum, an expire Time To Live, a firewall discard, or a Virtual Local Area Network mismatch.

6. The method of claim 1, wherein the collector operates within a control plane of the network device.

7. The method of claim 1, wherein the collector operates on a controller external to the network device.

8. The method of claim 1, comprising, in response to receiving a threshold number of IPFIX exception packets that include the unique exception code identifying a particular cause, triggering, by the collector, an alert.

9. A network device comprising:
    a forwarding plane comprising a plurality of forwarding components to route transit packets from input interfaces to output interfaces of the network device;
    a control plane comprising one or more processors;
    a traffic monitor configured for execution by the control plane to, when one of the forwarding components drops one of the transit packets:
        generate an exception packet comprising for the dropped transit packet:
            a unique exception code that identifies a cause for the forwarding component in the network device to discard the dropped transit packet received on the network device, and
            a nexthop index identifying a forwarding path being taken by the transit packet experiencing an exception, the nexthop index identifying an egress path for the transit packet from the network device to a destination network device; and
        forward the exception packet to a collector to be processed to identify when the forwarding component that discarded the dropped transit packet is experiencing a failure.

10. The network device of claim 9, wherein the traffic monitor is configured to receive, from the forwarding component that discarded the dropped transit packet, at least a portion of the dropped transit packet accompanied by the nexthop index and the unique exception code.

11. The network device of claim 10, wherein the transit packet is forwarded to the traffic monitor via a nexthop inserted into the transit packet.

12. The network device of claim 10, wherein, to receive, from the forwarding component, at least a portion of the transit packet accompanied by the nexthop index and the unique exception code, the traffic monitor is configured to receive a discard packet with a nexthop to direct the discard packet to the traffic monitor, the discard packet including the portion of the transit packet, the nexthop index, and the unique exception code.

13. The network device of claim 9, wherein the exception packet is encoded according to a predefined exception template.

14. The network device of claim 9, wherein the exception packet is an Internet Protocol Flow Information Export exception packet.

15. The network device of claim 9, wherein the collector operates within the control plane of the network device.

16. The network device of claim 9, wherein the collector operates on a controller external to the network device.

17. The network device of claim 9, wherein, in response to receiving a threshold number of exception packets that include the unique exception code identifying a particular cause, the controller is configured to trigger an alert.

18. A computer readable medium comprising instructions that, when executed, cause one or more processors of a network device to:
    generate, by a traffic monitor operating on the network device, an exception packet comprising:
        a unique exception code that identifies a cause for a forwarding component in the network device to discard a transit packet received on the network device, and
        a nexthop index identifying a forwarding path being taken by the transit packet experiencing, an exception the nexthop index identifying an egress path for the transit packet from the network device to a destination network device; and
    forward the exception packet to a collector to be processed.

19. The computer readable medium of claim 18, wherein the instructions further cause the one or more processors of the traffic monitor to receive, from the forwarding component, at least a portion of the transit packet accompanied by the nexthop index and the unique exception code, the transit packet being received via a nexthop index inserted into the transit packet.

20. The computer readable medium of claim 18, wherein the instructions cause the network device to execute the collector, wherein the collector is to identify when the forwarding component that discarded the transit packet is experiencing a failure based on the nexthop index and the unique exception code.

* * * * *